United States Patent
Lefley et al.

(10) Patent No.: US 7,327,345 B2
(45) Date of Patent: Feb. 5, 2008

(54) INTERLACED MLA LCD STN DRIVER

(75) Inventors: Alastair Lefley, Kemble (GB); Toshiki Kitaguchi, Swindon (GB)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 648 days.

(21) Appl. No.: 10/830,155

(22) Filed: Apr. 22, 2004

(65) Prior Publication Data

US 2005/0219175 A1   Oct. 6, 2005

(30) Foreign Application Priority Data

Mar. 30, 2004   (EP) .................................. 04392017

(51) Int. Cl.
  *G09G 3/36*   (2006.01)
(52) U.S. Cl. ........................ 345/100; 345/92
(58) Field of Classification Search ........... 345/90–100
  See application file for complete search history.

(56) References Cited

U.S. PATENT DOCUMENTS

| | | | | |
|---|---|---|---|---|
| 5,124,818 | A * | 6/1992 | Conner et al. ................. | 349/75 |
| 5,512,915 | A * | 4/1996 | Leroux .......................... | 345/55 |
| 6,078,318 | A * | 6/2000 | Mori et al. .................... | 345/204 |
| 6,346,774 | B1 | 2/2002 | Tamai et al. ............... | 315/169.1 |
| 6,493,056 | B2 | 12/2002 | Bjorkengren et al. ....... | 349/151 |
| 6,888,606 | B2 * | 5/2005 | Hinata et al. ................ | 349/149 |
| 2002/0158832 | A1 | 10/2002 | Park et al. ..................... | 345/98 |
| 2003/0193491 | A1 | 10/2003 | Lawrence et al. .......... | 345/204 |

* cited by examiner

Primary Examiner—Richard Hjerpe
Assistant Examiner—Jean Lesperance
(74) Attorney, Agent, or Firm—Saile Ackerman LLC; Stephen B. Ackerman

(57) ABSTRACT

Liquid crystal display (LCD) systems and related methods to achieve reduced resistance of the connections between the display controller device and MLA common sub-groups or groups of signal lines of the display unit avoiding differences of contrast between adjacent lines of an LCD display unit have been achieved. In a preferred embodiment of a Multiple Line Addressing (MLA) Super Twisted Nematic (STN) LCD driver the lines of the common sub-groups are interlaced alternately from both sides of the display control device to the correspondent sides of the display unit in a way that the uppermost common sub-group is driven from a first side of the display control device, the second uppermost sub-group is driven from the side opposite to said first side, the third uppermost sub-group is driven from said first side again and so on. The number of lines per common sub-group is variable. One advantage of the interlaced scheme invented is that the overall glass routing distance is shorter hence reducing resistance. Furthermore, compared to prior art there is no longer a marked difference in routing distance between adjacent lines, thus avoiding differences of contrast. The interlacing scheme can be used for conventional LCD as well.

104 Claims, 2 Drawing Sheets

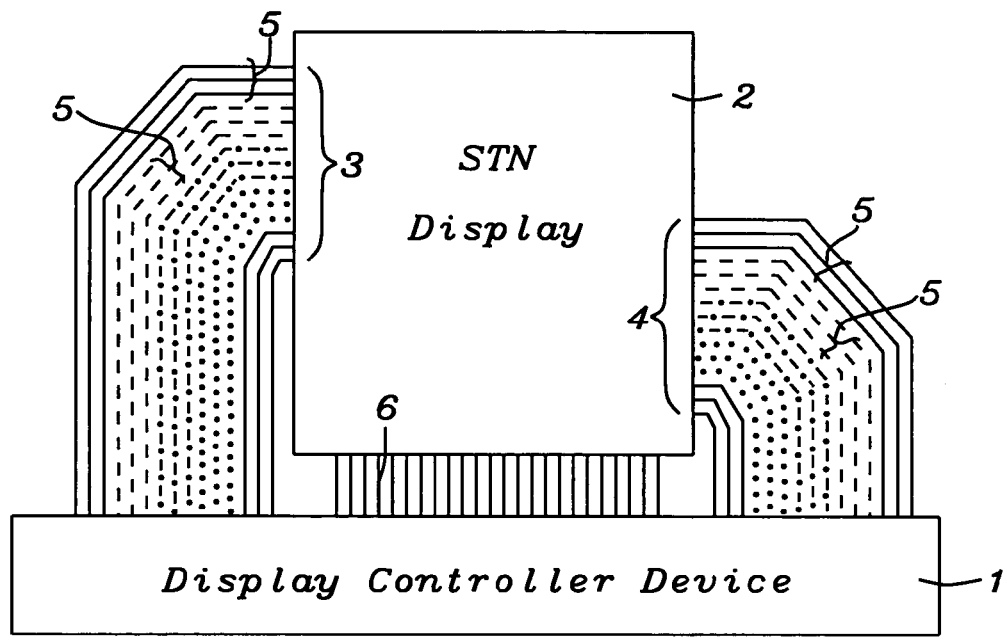
FIG. 1 – Prior Art
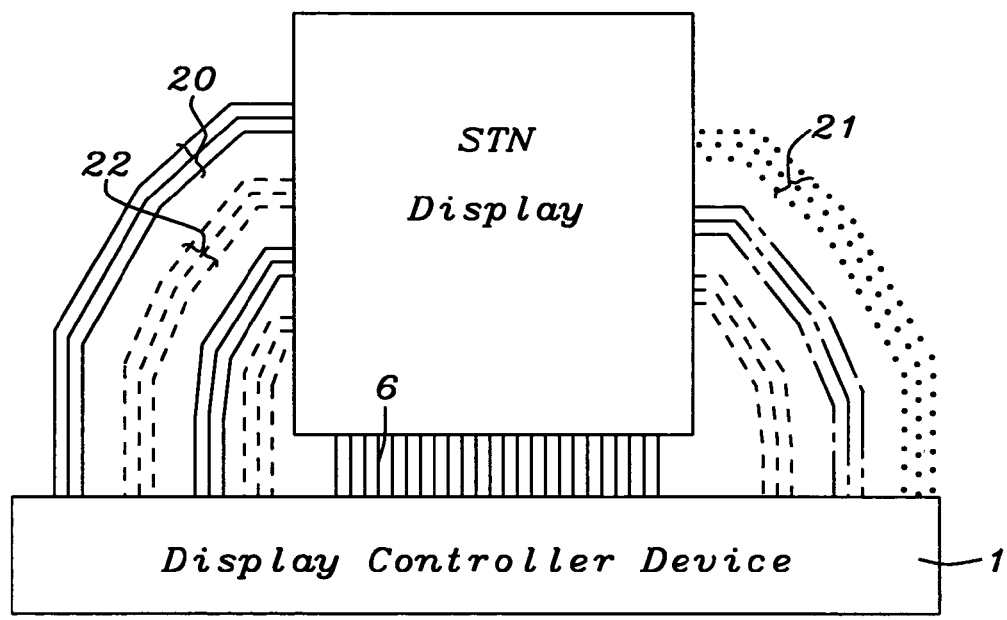
FIG. 2

INTERLACED MLA LCD STN DRIVER

BACKGROUND OF THE INVENTION (1) Field of the Invention

This invention relates generally to Liquid Crystal Displays (LCD) and relates more particularly to an interlaced technology to connect an LCD display controller device to a LCD display.

(2) Description of the Prior Art

Liquid Crystal Displays (LCDs) are used everywhere, for example TVs, laptop computers, CD players, digital clocks, watches, and many other electronic devices. They are common because they are thin, flat, having a high resolution with low voltage operation and low power consumption.

In order to build LCDs liquid crystals are placed between two sheets of glass, which are grooved to control the alignment of the molecules, i.e. the way they arrange themselves. The molecules follow the alignment of the grooves: if the grooves are parallel to each other so are the liquid crystal molecules. If the grooves on one sheet of glass are aligned north to south and the grooves on the other east to west, the molecules twist in between the sheets of glass. Light goes through the molecules and follows their alignment twisting 90 degrees as well. A voltage makes the molecules arrange themselves vertically which causes the light go through them untwisted.

On the two sheets of glass there are polarizing filters which prevent all other light waves expect the ones that come parallel to the filters. The filters are placed so that one is at 90 degrees to the other. This would block the light because to let the light go through the filters should be parallel. But as the liquid crystals are twisted the light passes through the second filter by following the twist of the molecules. Because liquid crystal molecules rearrange themselves vertically when a voltage is applied it is possible to block the light when wanted and prevent the light emerging from the other end. Thus there are two states: 1) no voltage, which means light passing through and 2) applied voltage, which prevents the light coming out of the other end.

The orientation of the alignment layers varies between 90 and 270 degrees. By the degree of the twist nematic LCDs can be divided into two groups: LCDs with 90 degrees twist are called twisted nematic (TN) and with 270 degrees super twisted nematic (STN) displays.

Due to the relative slow response of the liquid crystal (LC) material itself to changes in addressing voltages a phenomenon called "smearing" appeared in the display of fast moving objects. In order to enable screens to display video images, new LC materials were developed with lower viscosity. If the viscosity of LC material is lowered so as to realize fast response, the root-mean-square (rms) response of liquid crystal is disabled but the frame response (response to the driving voltage waveform itself) is enabled. Consequently, if the liquid crystal is driven by the conventional line-by-line selection addressing, in which the applied voltage is concentrated in one part of one frame period, the transmission of off display pixel parts increases and the transmission of on display pixels reduces. As a result, the contrast of displayed images lowers, so that satisfactory display characteristics cannot be obtained.

Multiple line addressing (MLA) has been recently introduced as a driving method, which can suppress the above-mentioned frame response phenomenon. The feature of MLA is that several scanning lines can be selected simultaneously, and the selection pulse interval can be shortened without the selection pulse width. This implies that the selection pulse can be dispersed over one frame period. As a result, the frame response phenomenon can be suppressed, and high contrast can be obtained.

FIG. 1 prior art shows a conventional scheme to interconnect a display controller device 1 with a MLA STN display 2. It is obvious to those skilled in art that FIG. 1 prior art shows an example only. The number of sub-groups is in reality much higher compared to the number of sub-groups shown in FIG. 1 prior art. In this scheme the upper half 3 of the display has its MLA common sub-groups driven from the left of the display controller device 1. The lower half of the display has its MLA common sub-group driven from the right of the display controller device 1. In this example an MLA scheme using three common lines 5 to make up a sub-group is shown. The vertical "segment" columns are connected to the middle of the display controller device 1 by segment lines 6.

It should be understood that the common sub-groups are not always all driven from the topside of the display controller device. Sometimes they are driven from the left-hand end and right-hand end of the device. Sometimes they are driven from the bottom side of the device It is a challenge for a designer of such display systems to minimize the resistance of the common lines and to avoid a marked difference in routing distance between the lowermost common sub-group display lines in the upper half of the display and the uppermost common sub-group display lines in the lower half of the display. A difference in routing can produce a difference in contrast, which is undesirable between adjacent display lines.

There are patents and patent applications publications known dealing with the challenges of said display systems.

U.S. Pat. No. (6,346,774 to Tamai et al.) describes a method of driving a passive matrix of a LCD. Driving is effected by MLA under a condition of L.noteq.M or (M/L.multidot. (L+D)). noteq.N where M represents the total number of row electrodes, L represents the number of simultaneously selected row electrodes, D represents the number of dummy row electrodes and N represents the maximum magnifying power of a column voltage wherein driving is performed at a driving bias ratio which is deviated toward the minimum bias ratio with respect to the optimum bias ratio.

U.S. Patent Application Publication (2003/0193491 to Lawrence et al.) discloses a display device having a number of pixels to display an image. A first set of electrodes and a second set of electrodes are provided. To display an image in accordance with image data, the first and second sets of electrodes are addressed with a first set of drive signals and a second set of drive signals respectively in order to drive the pixels of the display device. The first set of drive signals is predefined. The image data is compressed. The second set of drive signals is obtained from the compressed image data.

U.S. Patent Application Publication (2002/0158832 to Park et al.) describes a driver for driving an STN LCD. A preferred embodiment comprises a 3-line output display data for storing display data, an XOR block for finding mismatches between each 3-line output set of the stored display and orthogonal function signals, a decoder block for calculating mismatch numbers, a level shifter block for shifting the data level of the mismatch numbers to another level, and a voltage selector block for selecting a voltage level from 2 levels of voltage. Because data latches and output latches are not necessary, the driver of the present invention achieves significant reduction in the circuit components and chip size without compromising the display quality.

SUMMARY OF THE INVENTION

A principal object of the present invention is to reduce resistance of the routing between a display controller device and common sub-groups of an LCD display.

Another principal object of the present invention is to avoid differences of contrast between adjacent display lines of an LCD display.

In accordance with the objects of this invention a Multi Line Addressing (MLA) Liquid Crystal Display (LCD) system has been achieved. Said system comprises a display unit and a display controller device, wherein the lines for each common sub-group between said display unit and said display controller device are interlaced from top to bottom of the display unit in a way that a first common sub-group is driven from a first side of the display controller device, a second common sub-group is driven from the opposite to first side of the display controller device, a third sub-group is driven from the first side again, a fourth common sub-group is driven from said opposite side again, and so on until the bottom of the display unit is reached.

In accordance with the objects of this invention another Multi Line Addressing (MLA) Liquid Crystal Display (LCD) system has been achieved. Said system comprises a display unit and a display controller device, wherein a number of MLA common sub-groups are bundled into MLA common groups and the lines for each common group between said display unit and said display controller device are interlaced from top to bottom of the display unit in a way that a first MLA common group is driven from a first side of the display controller device, a second common group is driven from the opposite to first side of the display controller device, a third common group is driven from the first side again, a fourth common group is driven from said opposite side again, and so on until the bottom of the display unit is reached.

In accordance with the objects of this invention a Liquid Crystal Display (LCD) system has been achieved. Said system comprises a display unit and a display controller device, wherein a number of common signal lines are bundled into common signal groups and the lines for each common signal group between said display unit and said display controller device are interlaced from top to bottom of the display unit in a way that a first common signal group is driven from a first side of the display controller device, a second common signal group is driven from the opposite to first side of the display controller device, a third common signal group is driven from the first side again, a fourth common signal group is driven from said opposite side again, and so on until the bottom of the display unit is reached.

In accordance with the objects of this invention a method to achieve reduced resistance of the connections between the display controller device and the MLA common sub-groups of the display unit of an MLA LCD display system avoiding differences of contrast between adjacent lines of the LCD display unit has been achieved. Said method comprises, firstly, providing an MLA LCD display unit and a MLA LCD display controller device, The steps of the method invented are to define number of lines per MLA common sub-group, and to interlace lines of MLA common sub-groups alternately from both sides of the display control device to the correspondent sides of the display unit in a way that the uppermost MLA sub-group is driven from a first side of the MLA display control device, the second uppermost MLA sub-group is driven from the side opposite to said first side, the third uppermost MLA sub-group is driven from said first side again and so on.

In accordance with the objects of this invention a method to achieve reduced resistance of the connections between the display controller device and the MLA common sub-groups of the display unit of an MLA LCD display system avoiding differences of contrast between adjacent lines of the LCD display unit has been achieved. Said method comprises, firstly, providing an MLA LCD display unit and a MLA LCD display controller device, The steps of the method invented are to define number of lines per MLA common sub-group, to define number of MLA common sub-groups per MLA common group, and to interlace lines of MLA common groups alternately from both sides of the MLA display control device to the correspondent sides of the MLA display unit in a way that the uppermost MLA common group is driven from a first side of the MLA display control device, the second uppermost MLA common group is driven from the side opposite to said first side, the third uppermost MLA common group is driven from said first side again and so on.

BRIEF DESCRIPTION OF THE DRAWINGS

In the accompanying drawings forming a material part of this description, there is shown:

FIG. 1 prior art shows a conventional scheme of the routing between an LCD display controller device and a LCD STN display.

FIG. 2 shows a scheme of the present invention of the routing between an LCD display controller device and a LCD STN display.

DESCRIPTION OF THE PREFERRED EMBODIMENTS

Figure 3A:
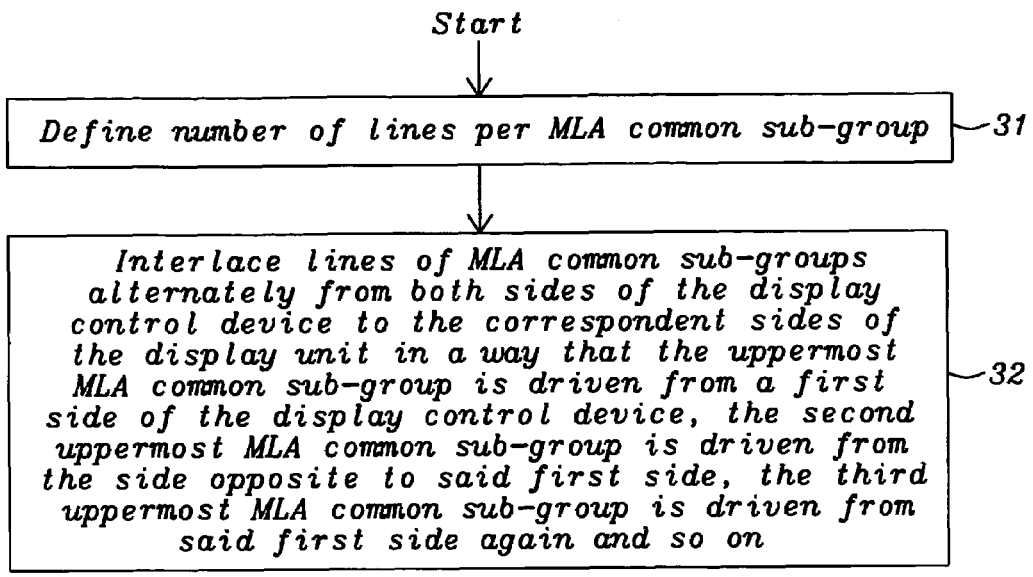
FIG. 3a shows a flowchart of a method invented to achieve reduced resistance of the connections between a MLA display controller device and common sub-groups of the display unit avoiding differences of contrast between adjacent lines of an MLA LCD display unit.

The preferred embodiments disclose a novel driver to drive an MLA LCD STN display. The MLA LCD driver of the present invention is using an improved topology to achieve an overall reduced glass routing distance, both for average track length and for the longest track. This means reduced resistance.

Furthermore a marked difference in routing distance is avoided and hence differences of contrast between adjacent lines are prevented.

FIG. 2 shows a preferred embodiment of the present invention In this interlaced scheme the top group of lines 20 of the display 2 is an MLA common sub-group that is driven from the left of the LCD display controller device 1. The second group of lines 21 from top of the display 2 is an MLA common sub-group that is driven from the right of the LCD display controller device 1. The third group of lines 22 from top of the display 2 is an MLA common sub-group that is driven from the left of the display controller device 1, the fourth group of lines 24 is driven from the right of the display controller device 1. The remaining groups of line are following the same interlaced scheme. It is obvious to those skilled in art that FIG. 2 shows an example only. The number of sub-groups is in reality much higher compared to the number of sub-groups shown in FIG. 2. In the example shown in FIG. 2 three common lines are used to make a sub-group. Other numbers of lines are possible as well to make a sub-group.

In summary, the glass routing distance of the present invention is shorter compared to prior art, both for track length and for the longest tracks, thus achieving a reduced resistance of the common lines.

Furthermore there will no longer be a marked difference in routing distance between the lowermost common sub-group display lines in the upper half of the display and the uppermost common sub-group display lines in the lower half of the display. A difference in routing can produce a difference in contrast, which is undesirable between adjacent display lines.

Alternatively a few MLA common sub-groups can be bundled together into a MLA common group and said MLA common groups are then interlaced. This means instead driving one MLA common sub-group from one side of the display controller device and the next MLA common sub-group from the opposite side of the display, a first MLA common group is driven from one side of the display controller device, the next MLA common group is driven from the opposite side of the display controller device and so on. The number of MLA common sub-groups bundled in a MLA common group should be relatively small, e.g. two or three MLA common sub-groups per MLA common group.

Said grouping and interlacing described above can be used for other, non-MLA LCD displays as well. The routing has to be bundled in groups of two or more signals, similar to the MLA common sub-groups, and then interlaced following the scheme as described above.

It is obvious to those skilled in art that that the invention is not limited to MLA STN LCD displays only. The invention is applicable to any other MLA Twisted Nematic (TN) LCD displays such as e.g. Double Super Twisted Nematic (DSTN), Triple Super Twisted Nematic (TSTN), or Film compensated Super Nematic (FSTN) LCD displays and to any MLA scheme for an active matrix.

FIG. 3a describes the major steps of a method to achieve reduced resistance of the connections between a display controller device and MLA common sub-groups of the display unit avoiding differences of contrast between adjacent lines of an LCD display unit. In step 31 the number of lines per MLA common sub-group is defined. In step 32 the lines of the MLA common sub-groups are interlaced alternately from both sides of the display control device to the correspondent sides of the display unit in a way that the uppermost MLA common sub-group is driven from a first side of the display control device, the second uppermost MLA common sub-group is driven from the side opposite to said first side, the third uppermost MLA common sub-group is driven from said first side again and so on.

Figure 3B:
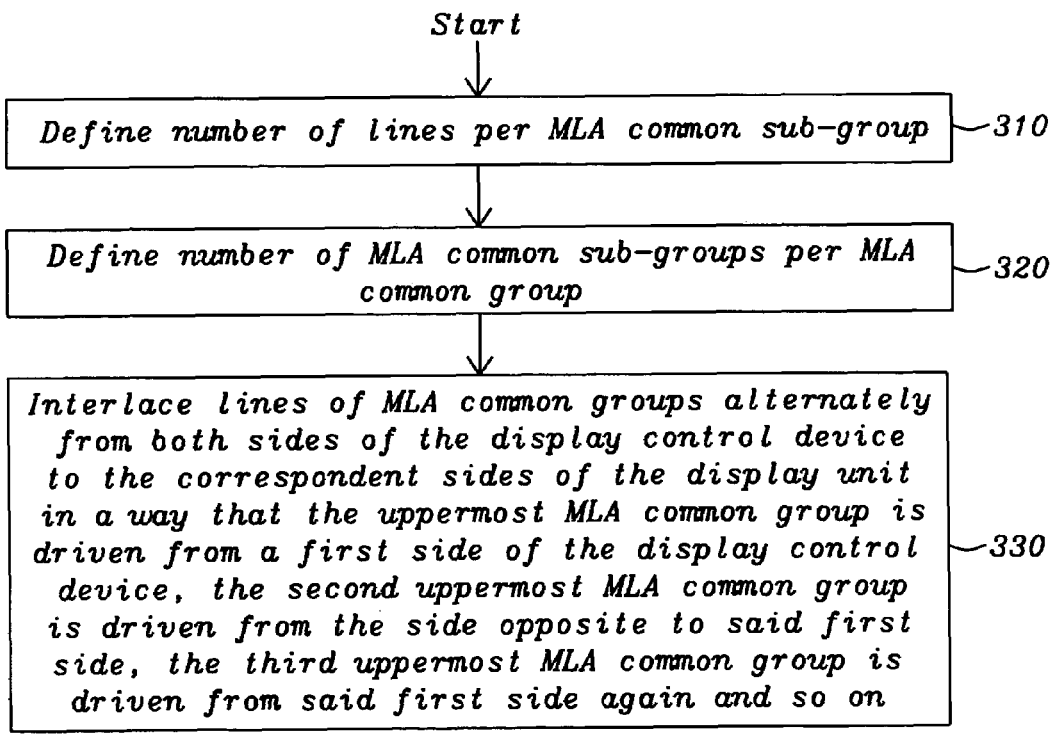
FIG. 3b shows a flowchart of another method invented to achieve reduced resistance of the connections between a MLA display controller device and common sub-groups of the display unit avoiding differences of contrast between adjacent lines of an MLA LCD display unit.

FIG. 3b describes the major steps of an alternative method to achieve reduced resistance of the connections between a display controller device and MLA common sub-groups of the display unit avoiding differences of contrast between adjacent lines of an LCD display unit. In step 310 the number of lines per MLA common sub-group is defined. In step 320 the number of MLA common sub-group per MLA common group is defined. This number should be relatively small; it can be e.g. two or three MLA common sub-groups per MLA common group. In step 330 the lines of the MLA common groups are interlaced alternately from both sides of the display control device to the correspondent sides of the display unit in a way that the uppermost MLA common group is driven from a first side of the display control device, the second uppermost MLA common group is driven from the side opposite to said first side, the third uppermost MLA common group is driven from said first side again and so on.

While the invention has been particularly shown and described with reference to the preferred embodiments thereof, it will be understood by those skilled in the art that various changes in form and details may be made without departing from the spirit and scope of the invention.

What is claimed is:

1. A Multi Line Addressing (MLA) Liquid Crystal Display (LCD) system comprising:
   a display unit; and
   a display controller device, wherein the lines for each common sub-group, each common sub-group comprising more than one consecutive lines, between said display unit and said display controller device are interlaced from top to bottom of the display unit in a way that a first common sub-group is driven from a first side of the display controller device, a second common sub-group is driven from the opposite to first side of the display controller device, a third sub-group is driven from the first side again, a fourth common sub-group is driven from said opposite side again, and so on until the bottom of the display unit is reached.

2. The system of claim 1 wherein said MLA common sub-group comprises any number of lines.

3. The system of claim 1 wherein said MLA common sub-group comprises three lines.

4. The system of claim 1 wherein said MLA LCD display is having an active matrix.

5. The system of claim 1 wherein said MLA LCD display is having a passive matrix.

6. The system of claim 5 wherein said MLA LCD display is an MLA Twisted Nematic (TN) LCD display.

7. The system of claim 6 wherein said MLA Twisted Nematic LCD display is an MLA Super Twisted Nematic (STN) LCD display.

8. The system of claim 6 wherein said MLA Twisted Nematic LCD display is an MLA Double Super-Twisted Nematic (DSTN) LCD display.

9. The system of claim 6 wherein said MLA common groups comprise three MLA common sub-groups.

10. A Multi Line Addressing (MLA) Liquid Crystal Display (LCD) system comprising:
    a display unit; and
    a display controller device, wherein a number of MLA common sub-groups, each common sub-group comprising more than one consecutive lines, are bundled into MLA common groups and the lines for each common group between said display unit and said display controller device are interlaced from top to bottom of the display unit in a way that a first MLA common group is driven from a first side of the display controller device, a second common group is driven from the opposite to first side of the display controller device, a third common group is driven from the first side again, a fourth common group is driven from said opposite side again, and so on until the bottom of the display unit is reached.

11. The system of claim 10 wherein said MLA common sub-group comprises any number of lines.

12. The system of claim 10 wherein said MLA common sub-group comprises three lines.

13. The system of claim 10 wherein said MLA LCD display is having an active matrix.

14. The system of claim 10 wherein said MLA LCD display is having a passive matrix.

15. The system of claim 14 wherein said MLA LCD display is an MLA Twisted Nematic (TN) LCD display.

16. The system of claim 15 wherein said MLA Twisted Nematic LCD display is an MLA Super Twisted Nematic (STN) LCD display.

17. The system of claim 13 wherein said MLA Twisted Nematic LCD display is an MLA Double Super-Twisted Nematic (DSTN) LCD display.

18. The system of claim 10 wherein said MLA common groups comprise two MLA common sub-groups.

19. The system of claim 10 wherein said MLA common groups comprise three MLA common sub-groups.

20. A Liquid Crystal Display (LCD) system comprising:
a display unit; and
a display controller device, wherein a number of consecutive common signal lines are bundled into common signal groups and the lines for each common signal group between said display unit and said display controller device are interlaced from top to bottom of the display unit in a way that a first common signal group is driven from a first side of the display controller device, a second common signal group is driven from the opposite to first side of the display controller device, a third common signal group is driven from the first side again, a fourth common signal group is driven from said opposite side again, and so on until the bottom of the display unit is reached.

21. The system of claim 20 wherein said common signal group comprises any number of lines.

22. The system of claim 18 wherein said common signal group comprises two lines.

23. The system of claim 18 wherein said common signal group comprises two lines.

24. The system of claim 18 wherein said LCD display is having a passive matrix.

25. The system of claim 24 wherein said LCD display is a Twisted Nematic (TN) LCD display.

26. The system of claim 25 wherein said Twisted Nematic LCD display is a Super Twisted Nematic (STN) LCD display.

27. The system of claim 25 wherein said Twisted Nematic LCD display is a Double Super-Twisted Nematic (DSTN) LCD display.

28. A method to achieve reduced resistance of the connections between the display controller device and the MLA common sub-groups of the display unit of an MLA LCD display system avoiding differences of contrast between adjacent lines of the LCD display unit comprising the following steps:
providing an MLA LCD display unit and a MLA LCD display controller device;
define number of lines per MLA common sub-group, each common sub-group comprising more than one consecutive lines; and
interlace lines of MLA common sub-groups alternately from both sides of the display control device to the correspondent sides of the display unit in a way that the uppermost MLA sub-group is driven from a first side of the MLA display control device, the second uppermost MLA sub-group is driven from the side opposite to said first side, the third uppermost MLA sub-group is driven from said first side again and so on.

29. The method of claim 28 wherein said common sub-group comprises any number of lines.

30. The method of claim 28 wherein said common sub-group comprises three lines.

31. The method of claim 28 wherein said MLA LCD display is having an active matrix.

32. The method of claim 28 wherein said MLA LCD display is having a passive matrix.

33. The method of claim 32 wherein said MLA LCD display is a Twisted Nematic (TN) LCD display.

34. The method of claim 33 wherein said Twisted Nematic LCD display is a Super Twisted Nematic (STN) LCD display.

35. The method of claim 33 wherein said Twisted Nematic LCD display is a Double Super-Twisted Nematic (DSTN) LCD display.

36. A method to achieve reduced resistance of the connections between the display controller device and the MLA common sub-groups of the display unit of an MLA LCD display system avoiding differences of contrast between adjacent lines of the LCD display unit comprising the following steps:
providing an MLA LCD display unit and a MLA LCD display controller device, wherein a defined number of MLA common sub-groups is bundled into a MLA common group;
define number of consecutive lines per MLA common sub-group;
define number of MLA common sub-groups per MLA common group; and
interlace lines of MLA common groups alternately from both sides of the MLA display control device to the correspondent sides of the MLA display unit in a way that the uppermost MLA common group is driven from a first side of the MLA display control device, the second uppermost MLA common group is driven from the side opposite to said first side, the third uppermost MLA common group is driven from said first side again and so on.

37. The method of claim 36 wherein said common sub-group comprises any number of lines.

38. The method of claim 36 wherein said common sub-group comprises three lines.

39. The method of claim 36 wherein said MLA LCD display is having an active matrix.

40. The method of claim 36 wherein said MLA LCD display is having a passive matrix.

41. The method of claim 40 wherein said MLA LCD display is a Twisted Nematic (TN) LCD display.

42. The method of claim 41 wherein said Twisted Nematic LCD display is a Super Twisted Nematic (STN) LCD display.

43. The method of claim 41 wherein said Twisted Nematic LCD display is a Double Super-Twisted Nematic (DSTN) LCD display.

44. A Multi-Line Addressing (MLA) Liquid Crystal Display (LCD) system comprising:
a display unit; and
a display controller device, wherein the lines for each common sub-group, each common sub-group comprising more than one consecutive lines, between said display unit and said display controller device are interlaced in a way that a first common sub-group is driven from a first side of the display controller device, a second common sub-group is driven from the opposite to first side of the display controller device, a third sub-group is driven from the first side again, a fourth common sub-group is driven from said opposite side again, and so on until all common sub-groups are connected between said display unit and said display controller device.

45. The system of claim 44 wherein said MLA common sub-group comprises any number of lines.

46. The system of claim 44 wherein said MLA common sub-group comprises three lines.

47. The system of claim 44 wherein said MLA LCD display is having an active matrix.

48. The system of claim 44 wherein said MLA LCD display is having a passive matrix.

49. The system of claim 48 wherein said MLA LCD display is an MLA Twisted Nematic (TN) LCD display.

50. The system of claim 49 wherein said MLA Twisted Nematic LCD display is an MLA Super Twisted Nematic (STN) LCD display.

51. The system of claim 49 wherein said MLA Twisted Nematic LCD display is an MLA Double Super-Twisted Nematic (DSTN) LCD display.

52. A Multi Line Addressing (MLA) Liquid Crystal Display (LCD) system comprising:
a display unit; and
a display controller device, wherein a number of MLA common sub-groups, each common sub-group comprising more than one consecutive lines, are bundled into MLA common groups and the lines for each common group between said display unit and said display controller device are interlaced in a way that a first MLA common group is driven from a first side of the display controller device, a second common group is driven from the opposite to first side of the display controller device, a third common group is driven from the first side again, a fourth common group is driven from said opposite side again, and so on until all MLA common groups are connected between said display unit and said display controller device.

53. The system of claim 52 wherein said MLA common sub-group comprises any number of lines.

54. The system of claim 52 wherein said MLA common sub-group comprises three lines.

55. The system of claim 52 wherein said MLA LCD display is having an active matrix.

56. The system of claim 52 wherein said MLA LCD display is having a passive matrix.

57. The system of claim 56 wherein said MLA LCD display is an MLA Twisted Nematic (TN) LCD display.

58. The system of claim 57 wherein said MLA Twisted Nematic LCD display is an MLA Super Twisted Nematic (STN) LCD display.

59. The system of claim 57 wherein said MLA Twisted Nematic LCD display is an MLA Double Super-Twisted Nematic (DSTN) LCD display.

60. The system of claim 52 wherein said MLA common groups comprise two MLA common sub-groups.

61. A Liquid Crystal Display (LCD) system comprising:
a display unit; and
a display controller device, wherein a number of consecutive common signal lines are bundled into common signal groups and the lines for each common signal group between said display unit and said display controller device are interlaced in a way that a first common signal group is driven from a first side of the display controller device, a second common signal group is driven from the opposite to first side of the display controller device, a third common signal group is driven from the first side again, a fourth common signal group is driven from said opposite side again, and so on until all common signal groups are connected between said display unit and said display controller device.

62. The system of claim 61 wherein said common signal group comprises any number of lines.

63. The system of claim 61 wherein said common signal group comprises two lines.

64. The system of claim 61 wherein said common signal group comprises three lines.

65. The system of claim 61 wherein said LCD display is having a passive matrix.

66. The system of claim 65 wherein said LCD display is a Twisted Nematic (TN) LCD display.

67. The system of claim 66 wherein said Twisted Nematic LCD display is a Super Twisted Nematic (STN) LCD display.

68. The system of claim 66 wherein said Twisted Nematic LCD display is a Double Super-Twisted Nematic (DSTN) LCD display.

69. A Multi-Line Addressing (MLA) Liquid Crystal Display (LCD) controller device driving an MLA LCD display unit, wherein the lines for each common sub-group, each common sub-group comprising more than one consecutive lines, between said LCD display unit and said display controller device are interlaced in a way that a first common sub-group is driven from a first side of the display controller device, a second common sub-group is driven from the opposite to first side of the display controller device, a third sub-group is driven from the first side again, a fourth common sub-group is driven from said opposite side again, and so on until all common sub-groups are connected.

70. The controller device of claim 69 wherein said MLA common sub-group comprises any number of lines.

71. The controller device of claim 69 wherein said MLA common sub-group comprises three lines.

72. The controller device of claim 69 wherein said MLA LCD display is having an active matrix.

73. The controller device of claim 69 wherein said MLA LCD display is having a passive matrix.

74. The controller device of claim 73 wherein said MLA LCD display is an MLA Twisted Nematic (TN) LCD display.

75. The controller device of claim 74 wherein said MLA Twisted Nematic LCD display is an MLA Super Twisted Nematic (STN) LCD display.

76. The controller device of claim 74 wherein said MLA Twisted Nematic LCD display is an MLA Double Super-Twisted Nematic (DSTN) LCD display.

77. The controller device of claim 69 wherein all common sub-groups driven from a first side of the display controller device are connected to the same first side of said LCD display unit and all common sub-groups driven from the opposite to first side of the display controller device are connected to the correspondent side of said LCD display unit opposite to the previous side.

78. A Multi-Line Addressing (MLA) Liquid Crystal Display (LCD) controller device, wherein a number of MLA common sub-groups are bundled into MLA common groups and the lines for each common group, each common sub-group comprising more than one consecutive lines, between said display unit and said display controller device are interlaced in a way that a first MLA common group is driven from a first side of the display controller device, a second common group is driven from the opposite to first side of the display controller device, a third common group is driven from the first side again, a fourth common group is driven from said opposite side again, and so on until all MLA common groups are connected between said display unit and said display controller device.

79. The controller device of claim 78 wherein said MLA common sub-group comprises any number of lines.

80. The controller device of claim 78 wherein said MLA common sub-group comprises three lines.

81. The controller device of claim 78 wherein said MLA LCD display is having an active matrix.

82. The controller device of claim 78 wherein said MLA LCD display is having a passive matrix.

83. The controller device of claim 82 wherein said MLA LCD display is an MLA Twisted Nematic (TN) LCD display.

84. The controller device of claim 83 wherein said MLA Twisted Nematic LCD display is an MLA Super Twisted Nematic (STN) LCD display.

85. The controller device of claim 83 wherein said MLA Twisted Nematic LCD display is an MLA Double Super-Twisted Nematic (DSTN) LCD display.

86. The controller device of claim 78 wherein all common sub-groups driven from a first side of the display controller device are connected to the same first side of said LCD display unit and all common sub-groups driven from the opposite to first side of the display controller device are connected to the correspondent side of said LCD display unit opposite to the previous side.

87. A method to achieve reduced resistance of the connections between a display controller device and an MLA common sub-groups of a display unit of an MLA LCD display system avoiding differences of contrast between adjacent lines of the LCD display unit comprising the following steps:
   providing an MLA LCD display unit and a MLA LCD display controller device;
   define number of consecutive lines per MLA common sub-group; and
   interlace lines of MLA common sub-groups alternately from both sides of the display control device to the correspondent sides of the display unit in a way that a first MLA sub-group is driven from a first side of the MLA display control device, a second MLA sub-group is driven from the side opposite to said first side, a third MLA sub-group is driven from said first side again and so on.

88. The method of claim 87 wherein said common sub-group comprises any number of lines.

89. The method of claim 88 wherein said common sub-group comprises three lines.

90. The method of claim 87 wherein said MLA LCD display is having an active matrix.

91. The method of claim 87 wherein said MLA LCD display is having a passive matrix.

92. The method of claim 91 wherein said MLA LCD display is a Twisted Nematic (TN) LCD display.

93. The method of claim 92 wherein said Twisted Nematic LCD display is a Super Twisted Nematic (STN) LCD display.

94. The method of claim 92 wherein said Twisted Nematic LCD display is a Double Super-Twisted Nematic (DSTN) LCD display.

95. A method to achieve reduced resistance of the connections between a display controller device and an MLA common sub-groups of a display unit of an MLA LCD display system avoiding differences of contrast between adjacent lines of the LCD display unit comprising the following steps:
   providing an MLA LCD display unit and a MLA LCD display controller device, wherein a defined number of MLA common sub-groups is bundled into MLA common groups;
   define number of consecutive lines per MLA common sub-group;
   define number of MLA common sub-groups per MLA common group; and
   interlace lines of MLA common groups alternately from both sides of the MLA display control device to the correspondent sides of the MLA display unit in a way that a first MLA common group is driven from a first side of the MLA display control device, a second MLA common group is driven from the side opposite to said first side, a third MLA common group is driven from said first side again and so on.

96. The method of claim 95 wherein said common sub-group comprises any number of lines.

97. The method of claim 95 wherein said common sub-group comprises three lines.

98. The method of claim 95 wherein said MLA LCD display is having an active matrix.

99. The method of claim 95 wherein said MLA LCD display is having a passive matrix.

100. The method of claim 99 wherein said MLA LCD display is a Twisted Nematic (TN) LCD display.

101. The method of claim 100 wherein said Twisted Nematic LCD display is a Super Twisted Nematic (STN) LCD display.

102. The method of claim 100 wherein said Twisted Nematic LCD display is a Double Super-Twisted Nematic (DSTN) LCD display.

103. The system of claim 95 wherein said MLA common groups comprise two MLA common sub-groups.

104. The system of claim 95 wherein said MLA common groups comprise three MLA common sub-groups.

* * * * *